United States Patent
Karacali-Akyamac et al.

(10) Patent No.: US 8,107,385 B2
(45) Date of Patent: Jan. 31, 2012

(54) EVALUATING QUALITY OF SERVICE IN AN IP NETWORK WITH COOPERATING RELAYS

(75) Inventors: Bengi Karacali-Akyamac, Bridgewater, NJ (US); Mark John Karol, Fair Haven, NJ (US); Anjur Sundaresan Krishnakumar, Rocky Hill, NJ (US); Parameshwaran Krishnan, Basking Ridge, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1094 days.

(21) Appl. No.: 11/329,933

(22) Filed: Jan. 11, 2006

(65) Prior Publication Data

US 2007/0081460 A1    Apr. 12, 2007

Related U.S. Application Data

(60) Provisional application No. 60/722,067, filed on Sep. 29, 2005.

(51) Int. Cl.
*H04L 12/26* (2006.01)
(52) U.S. Cl. ....................................................... 370/252
(58) Field of Classification Search .................. 370/229, 370/230, 241, 241.1, 252, 351, 389, 400; 709/223–226, 249
See application file for complete search history.

(56) References Cited

U.S. PATENT DOCUMENTS

| | | | |
|---|---|---|---|
| 6,473,405 B2 | 10/2002 | Ricciulli | |
| 6,515,977 B2 | 2/2003 | Bi et al. | |
| 6,594,235 B1 | 7/2003 | Rochberger et al. | |
| 6,732,189 B1* | 5/2004 | Novaes | 709/249 |
| 6,748,433 B1 | 6/2004 | Yaakov | |
| 6,798,765 B2 | 9/2004 | Larsson | |
| 6,914,883 B2 | 7/2005 | Dharanikota | |
| 7,106,756 B1* | 9/2006 | Donovan et al. | 370/468 |
| 2002/0095489 A1* | 7/2002 | Yamagami | 709/224 |
| 2003/0039212 A1* | 2/2003 | Lloyd et al. | 370/235 |

(Continued)

FOREIGN PATENT DOCUMENTS

EP    1610496 A1    12/2005

(Continued)

OTHER PUBLICATIONS

Savin, Daniela, "CA Application No. 2,559,621 Office Action Apr. 17, 2009", , Publisher: CIPO, Published in: CA.

(Continued)

*Primary Examiner* — Derrick Ferris
*Assistant Examiner* — Omar Ghowrwal

(57) ABSTRACT

A technique is disclosed that evaluates a network path between (i) a first node in a first subnetwork of endpoint nodes, such as IP phones, and (ii) a second node in a second subnetwork. A "ricochet" node in the network path evaluates the path by probing one or both subnetworks, where the ricochet node acts as relay for traffic packets being transmitted between the two subnetworks. A given relay has only to probe a single, representative node within a subnetwork at any given time in order to obtain performance data that is representative of the subnetwork overall. By probing the representative node, the relay is able to acquire an assessment of network conditions that is valid for the path between the relay and any endpoint in the subnetwork. As a result, the disclosed technique reduces the probing overhead when many endpoint nodes on a given subnetwork are simultaneously active and experiencing adverse network conditions.

20 Claims, 11 Drawing Sheets

U.S. PATENT DOCUMENTS

| | | | |
|---|---|---|---|
| 2003/0108059 A1 | 6/2003 | Yew et al. | |
| 2003/0161265 A1* | 8/2003 | Cao et al. | 370/229 |
| 2003/0204616 A1* | 10/2003 | Billhartz et al. | 709/235 |
| 2004/0042473 A1 | 3/2004 | Park et al. | |
| 2004/0100949 A1 | 5/2004 | Bennett | |
| 2005/0081082 A1* | 4/2005 | Brodie et al. | 714/4 |
| 2006/0028991 A1 | 2/2006 | Tan et al. | |
| 2006/0089988 A1* | 4/2006 | Davie et al. | 709/225 |
| 2006/0221844 A1* | 10/2006 | Subramanian et al. | 370/248 |

FOREIGN PATENT DOCUMENTS

| | | |
|---|---|---|
| EP | 1701492 A1 | 9/2006 |
| WO | 02/080462 A1 | 10/2002 |
| WO | 03094546 A1 | 11/2003 |

OTHER PUBLICATIONS

Hopkins, Matthew A., "U.S. Appl. No. 11/861,079 Office Action Oct. 15, 2010", , Publisher: USPTO, Published in: US.

Kreppel, J., "EP Application No. 06 25 5016.5-2416 Office Action May 10, 2007", , Publisher: EPO, Published in: EP.

Kreppel, Jan, "EP Application No. 06 25 5016.5-2416 European Search Report Dec. 21, 2006", , Publisher: EPO, Published in: EP.

Varma, Suchita, "CA Application No. 2,638,941 Office Action Mar. 23, 2010", , Publisher: CIPO, Published in: CA.

Hopkins, Matthew A., "U.S. Appl. No. 11/861,079 Office Action Jan. 20, 2010", , Publisher: USPTO, Published in: US.

Hopkins, Matthew A., "U.S. Appl. No. 11/861,079 Office Action Apr. 28, 2010", , Publisher: USPTO, Published in: US.

Hopkins, Matthew A., "U.S. Appl. No. 11/861,079 Office Action Sep. 21, 2009", , Publisher: USPTO, Published in: US.

Tao et al., "Exploring the Performance Benefits of End-to-End Path Switching", "Proceedings of the 12th IEEE International Conference on Network Protocols Berlin, Germany Oct. 5-8, 2004 XP010734832", , Publisher: IEEE.

Shu Tao et al., "Improving VOIP Quality Through Path Switching", "24th Annual Joint Conference of the IEEE Computer and Communications Societies Miami, FL XP010829264", Mar. 13-17, 2005, Publisher: IEEE.

Pham et al., "Performance Analysis of Reactive Shortest Path and Multi-path Routing Mechanism With Load Balance", 2003, Publisher: IEEE.

Bayaa, Hassan, "CA Application No. 2,603,796 Office Action Nov. 3, 2009", , Publisher: CIPO, Published in: CA.

Plata-Andres, Isabel, "EP Application No. 07018790.1 European Search Report Jan. 31, 2008", , Publisher: EPO, Published in: EP.

Kaur, Pamit, "U.S. Appl. No. 11/765,242 Notice of Allowance Nov. 19, 2009", , Publisher: USPTO, Published in: US.

Kaur, Pamit, "U.S. Appl. No. 11/765,242 Office Action Jul. 24, 2009", , Publisher: USPTO, Published in: US.

Clemente Lafuente, G., "EP Application No. 08014897.6 European Search Report Dec. 6, 2010", , Publisher: EPO, Published in: EP.

Hopkins, Matthew A., "U.S. Appl. No. 11/861,079 Office Action Apr. 15, 2011", , Publisher: USPTO, Published in: US.

Varma, Suchita, "CA Application No. 2,638,941 Office Action Dec. 13, 2010", , Publisher: CIPO, Published in: CA.

* cited by examiner

EVALUATING QUALITY OF SERVICE IN AN IP NETWORK WITH COOPERATING RELAYS

REFERENCE TO RELATED APPLICATIONS

This application claims the benefit of U.S. Provisional Application 60/722,067, filed Sep. 29, 2005, which is also incorporated herein by reference.

FIELD OF THE INVENTION

The present invention relates to telecommunications in general, and, more particularly, to evaluating the quality of service in network paths that do not provide quality-of-service guarantees.

BACKGROUND OF THE INVENTION

FIG. 1 depicts a schematic diagram of a telecommunications network in the prior art, such as the Internet, which transports data packets from one node to another. When each node in the network can be both a source of packets and a destination, there are n(n−1) network paths through the network, wherein n is positive integer that represents the number of nodes in the network. For the purposes of this specification, a "network path" is defined as the physical route between a pair of source and destination nodes in a network.

Source and destination nodes, such as packet-based telephones (Internet Protocol-based or otherwise), are often members of subnetworks. For the purposes of this specification, term "subnetwork" is defined as a separately identifiable part of a larger network that typically represents a certain limited number (i.e., one or more) of source nodes or destination nodes, or both, such as in a building or geographic area, or in an individual local area network.

The service provided by a network path is characterized by its "quality of service," which, for the purposes of this specification, is defined as a function of the bandwidth, error rate, and latency from one node to another. For the purposes of this specification, the "bandwidth" from one node to another is defined as an indication of the amount of information per unit time that can be transported from the first node to the second. Typically, bandwidth is measured in bits or bytes per second. For the purposes of this specification, the "error rate" from one node to another is defined as an indication of the amount of information that is corrupted as it travels from the first node to the second. Typically, error rate is measured in bit errors per number of bits transmitted or in packets lost per number of packets transmitted. For the purposes of this specification, the "latency" from one node to another is defined as an indication of how much time is required to transport information from one node to another. Typically, latency is measured in seconds.

Some applications—for example, e-mail—are generally more tolerant of the quality of service provided by the network path, but some other applications—particularly telephony, and streaming audio and video—are generally very sensitive. While some network paths provide quality-of-service guarantees, many others, including most of those through the Internet, do not. The result is that the provisioning of applications like telephony through the Internet can require transmitting some packets of a given packet stream across one network path and transmitting other packets of the same stream (or a different stream) across another network path, in order to maintain the required or preferred quality of service level. This requires evaluating the various, possible network paths in a timely and efficient manner.

The need exists, therefore, for an invention that improves the evaluating of a network path's quality of service.

SUMMARY OF THE INVENTION

The present invention is a technique that attempts to improve the evaluating of a network path's quality of service, without some of the costs and disadvantages of doing so in the prior art. The network path that is evaluated is between (i) a first node in a first subnetwork of endpoint nodes (e.g., Internet Protocol telephones, etc.) and (ii) a second node in a second subnetwork. In accordance with the illustrative embodiment of the present invention, an intermediate relay node in the network path evaluates the path by probing one or both subnetworks. The relay node is addressable by a subnetwork node and is able to relay traffic packets between the two subnetworks. Specifically, a given relay has only to probe a single, representative node within a subnetwork at any given time in order to obtain performance data that is representative of the subnetwork overall.

By probing the representative node, the relay is able to acquire an assessment of network conditions that is valid for the path between the relay and any endpoint in the subnetwork. For example, if there are two nodes in a subnetwork and the relay is already probing the first node to collect a first series of probe responses, then the relay of the illustrative embodiment will use the first series of probe responses to also represent the network conditions between the relay and the second node in the subnetwork. As a result, the technique of the present invention reduces the probing overhead when many endpoint nodes on a given subnetwork are simultaneously active and experiencing adverse network conditions. For this reason, a relay that performs the probing is said to be "cooperating."

The cooperating relay, which can be any relay node—also known as a "ricochet" node—of the illustrative embodiment, uses either a probe that is already in progress or a new probe to assess the network conditions of the network path between the two endpoints and the ricochet node. The ricochet node gathers a first series of probe responses that represent the first endpoint and a second series of probe responses that represent the second endpoint. The ricochet node computes raw performance data for the end-to-end network path (i.e., between the two endpoints) based on the probe responses. The ricochet node, either periodically or sporadically, generates a quality-of-service measurement based on the performance data (and, therefore, on the probe responses as well) and transmits the measurement to the node that requested or needs the measurement.

It should be noted that some embodiments of the present invention can function without changing either the network router's routing tables or how the routers function. Furthermore, the node that requests the quality-of-service measurements can either have an address in the address space of the network or not. If it does not have an address in the address space of the network, the node can be either associated with another node that has an address in the address space of the network or not (i.e., it can be implemented as a "bump in a wire" which is invisible to the nodes in the network). And still furthermore, in some embodiments of the present invention, a ricochet node that provides the quality-of-service measurements can be any node in a network, and need have only one link to the network.

The illustrative embodiment comprises: receiving a request for a quality-of-service measurement of an indirect network path between a first node in a first subnetwork and a second node in a second subnetwork through a third node, wherein the indirect network path fails to provide a quality-of-service guarantee; and generating the quality-of-service measurement for the indirect network path, wherein the quality-of-service measurement is based on: (i) a first series of probe responses that corresponds to a first probing, by the third node, of a member node of the first subnetwork, and (ii) a second series of probe responses that corresponds to a second probing, by the third node, of a member node of the second subnetwork.

DETAILED DESCRIPTION

For the purposes of this specification, the term "probing," and its inflected forms, is defined as the technique of transmitting a packet to a node and receiving, from the node, performance-related results based on the packet. As part of probing, the transmitting of a packet can be repeated, either sporadically or periodically, for each network path being tested, in order to receive more than one set of results.

Figure 1:
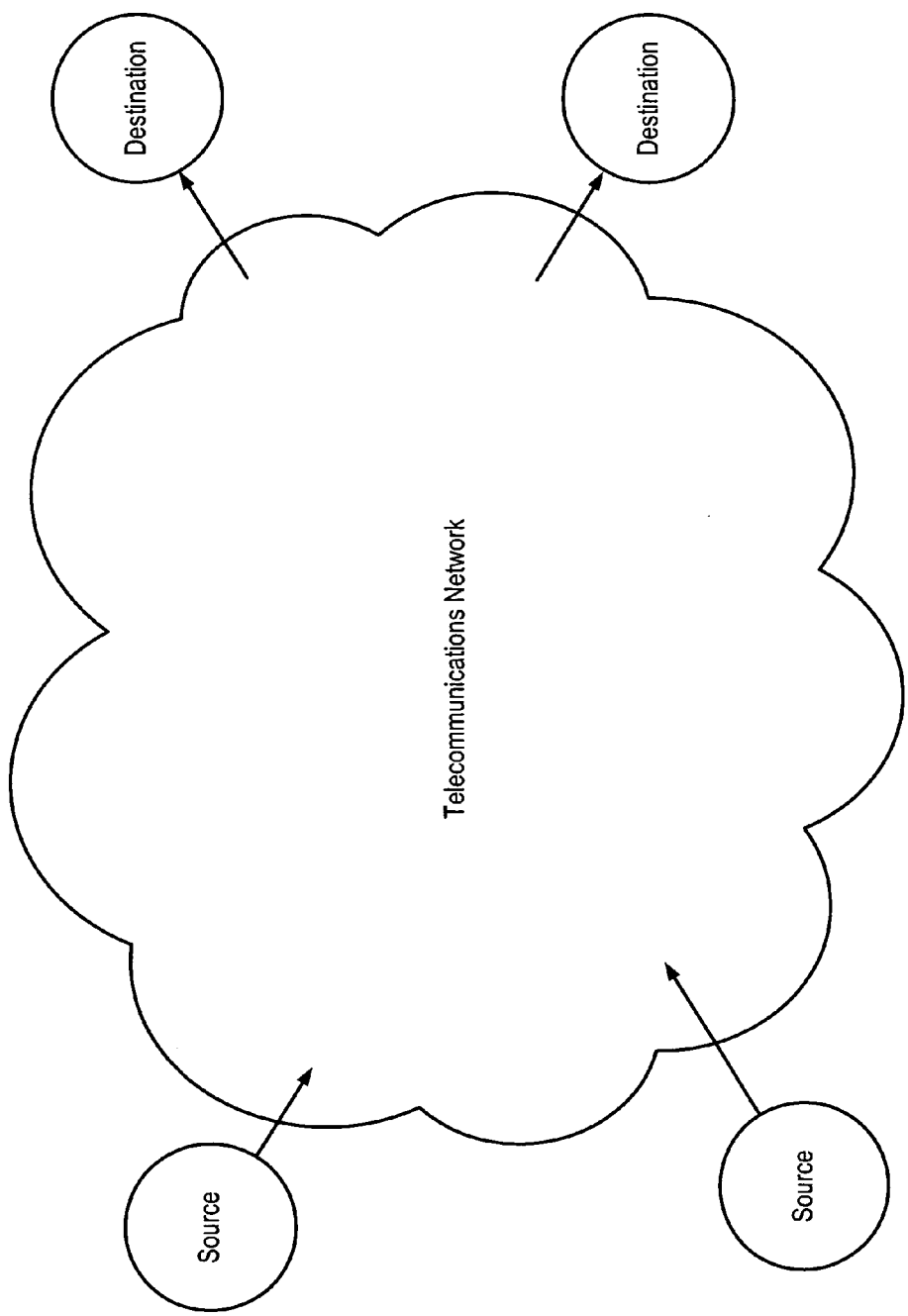
FIG. 1 depicts schematic diagram of a telecommunications network in the prior art, such as the Internet, which provides the service of transporting data packets from one node to another.
Figure 2:
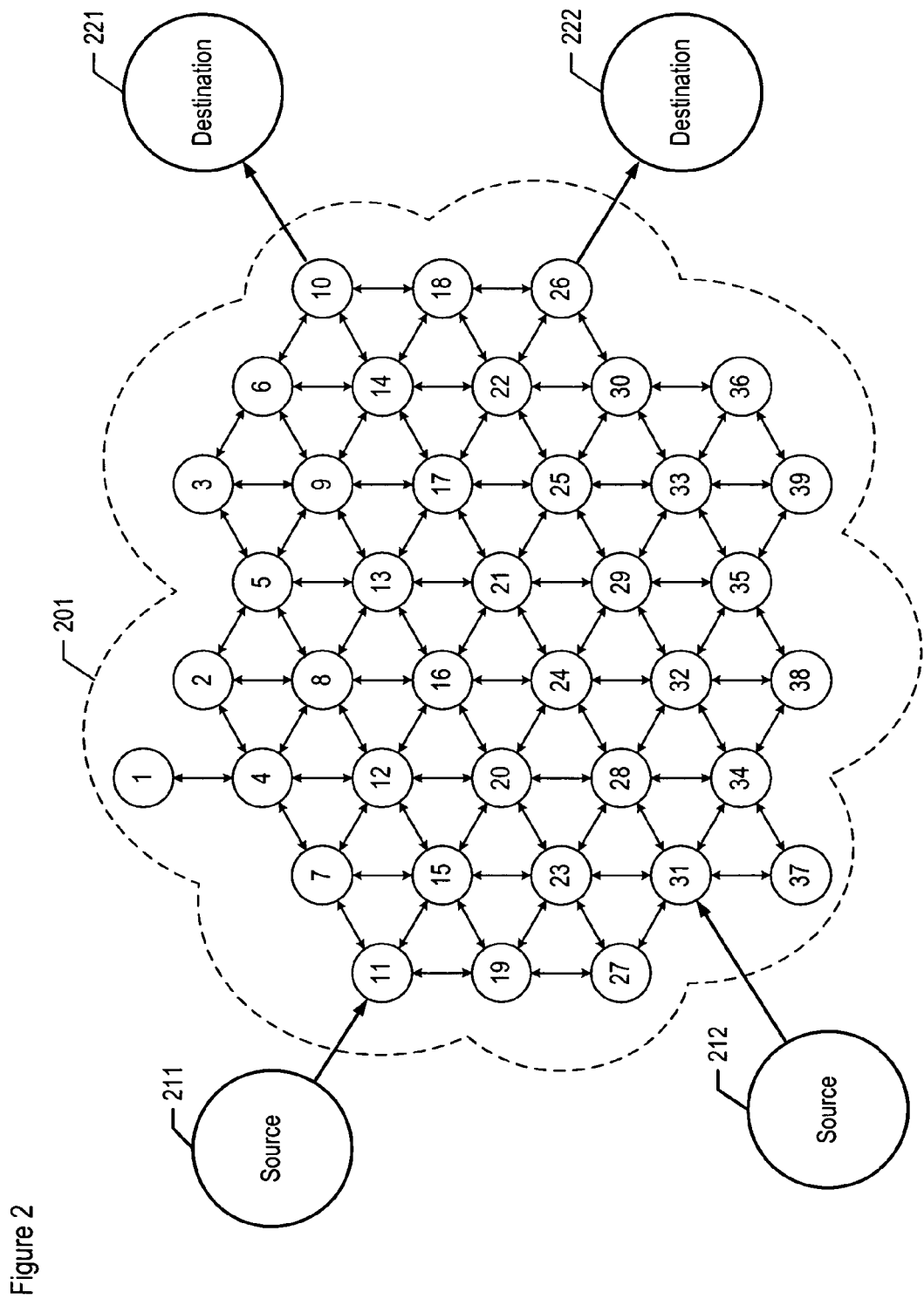
FIG. 2 depicts a schematic diagram of the salient components of a network in accordance with the illustrative embodiment of the present invention, and, in particular, depicts the physical resources that compose the network.

FIG. 2 depicts a schematic diagram of the salient components of a network in accordance with the illustrative embodiment of the present invention, and, in particular, depicts the physical resources that compose the network. Network 201 does not provide a quality-of-service guarantee to any packet or stream of packets (e.g., RTP packets, etc.) that it transports from source node 211 to destination node 222, and, therefore, the provisioning of real-time services, such as streaming audio and telephony, from source node 211 to destination node 222, is problematic without the present invention.

Network 201 comprises a plurality of nodes and their physical interconnections, arranged in the topology shown. It will be clear to those skilled in the art, however, after reading this specification, how to make and use alternative embodiments of the present invention with networks that comprise any number of nodes and have any topology. In particular, it will be clear to those skilled in the art, after reading this specification, how to make and use embodiments of the present invention with the Internet.

Each node in network 201 is capable of receiving a packet and of forwarding that packet to another node, in well-known fashion, based on the destination address in the packet. For example, when node 11 receives a packet from source node 211, which packet contains node 26 as its destination address, node 11 must decide which of its adjacent nodes—nodes 7, 15, and 19—to forward the packet to.

Each node in network 201 decides which adjacent node to give each packet to based on: (1) the destination address in the packet, and (2) a routing table in the node. Table 1 depicts a routing table for node 11 in accordance with the illustrative embodiment of the present invention.

TABLE 1

Routing Table for Node 11

| Destination node Address | Preferred Next Node | First Alternative Next Node | Second Alternative Next Node |
|---|---|---|---|
| 1 | 7 | 15 | 19 |
| 2 | 7 | 15 | 19 |
| 3 | 7 | 15 | 19 |
| ... | ... | ... | ... |
| 26 | 15 | 7 | 19 |
| ... | ... | ... | ... |
| 37 | 19 | 15 | 7 |
| 38 | 19 | 15 | 7 |
| 39 | 19 | 15 | 7 |

When all of the resources in the network are functioning and there is little network congestion, each node forwards a packet to the preferred next node listed in the routing table. For example, when node 11 receives a packet with the destination address 26, the preferred next node is node 15.

In contrast, when the preferred next node is not functioning or there is congestion at the preferred next node, the routing node can alternatively route the packet to the first alternative next node. For example, the first alternative next node at node 11 for a packet with the destination address 26 is node 7. And when the first alternative node is not functioning or there is congestion at the first alternative next node, the routing node can route the packet to the second alternative next node. The second alternative next node at node 11 for a packet with the destination address 26 is node 19.

When all of the resources in a network are functioning and there is little congestion, each node forwards a packet to the node listed as the entry for the preferred next node and the packet progresses from one preferred next node to the next and the next and so on until it reaches its destination node. For the purposes of this specification, the "primary nominal path" is defined as the chain of preferred next nodes from a source node to a destination node.

Figure 3:
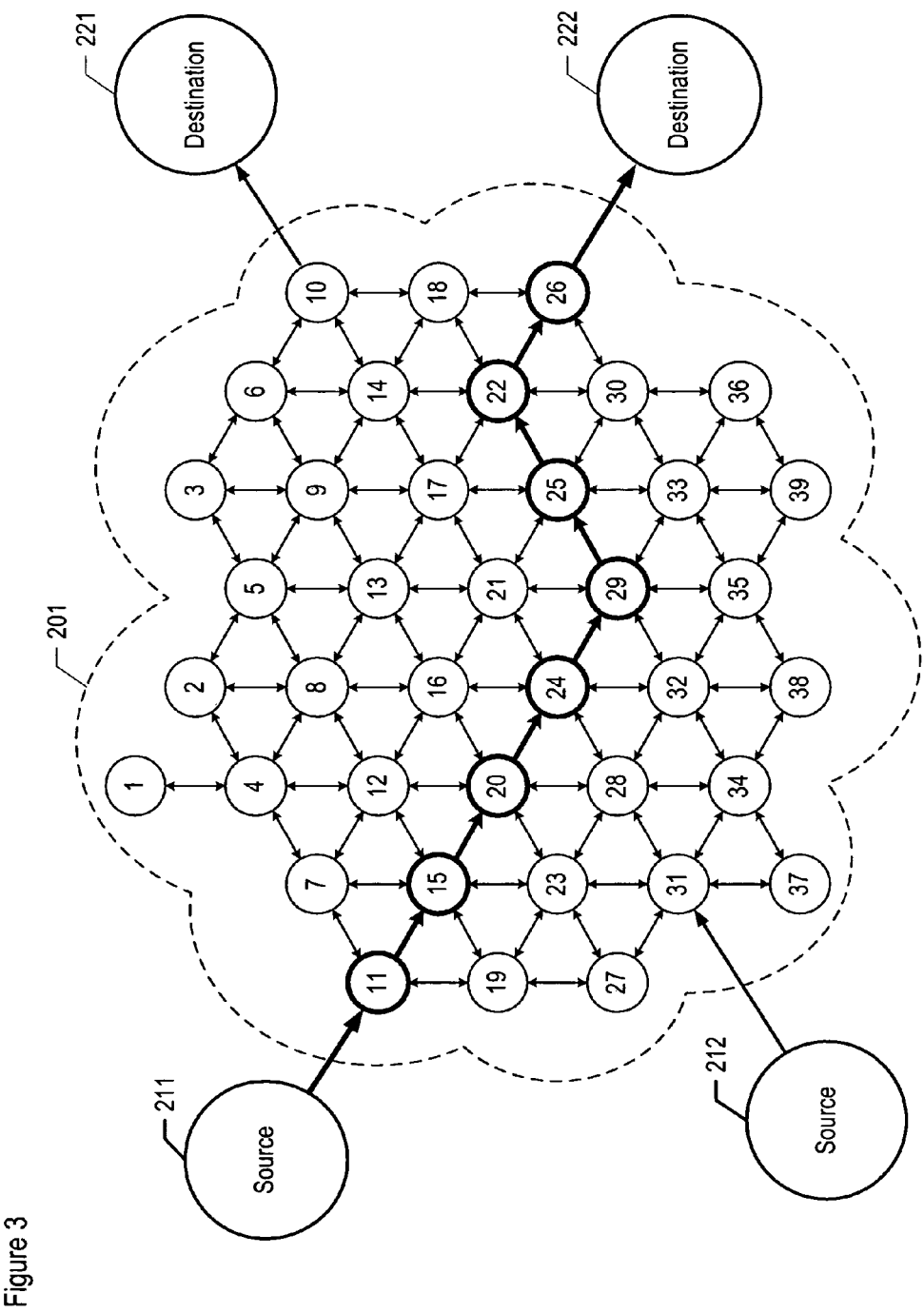
FIG. 3 depicts the primary nominal path through network 201 from source node 211 to destination node 222, which comprises nodes 11, 15, 20, 24, 29, 25, 22, and 26.

FIG. 3 depicts the primary nominal path through network 201 from source node 211 to destination node 222, which comprises nodes 11, 15, 20, 24, 29, 25, 22, and 26. For any pair of source and destination nodes, there always exists one primary nominal path.

When any of the nodes in the primary nominal path are not functioning or are experiencing congestion, a node in the primary nominal path can divert the packet from the primary nominal path onto an "alternative nominal path." For the purposes of this specification, an "alternative nominal path" is defined as a chain of preferred and alternative next nodes from a source node to a destination node.

Figure 4:
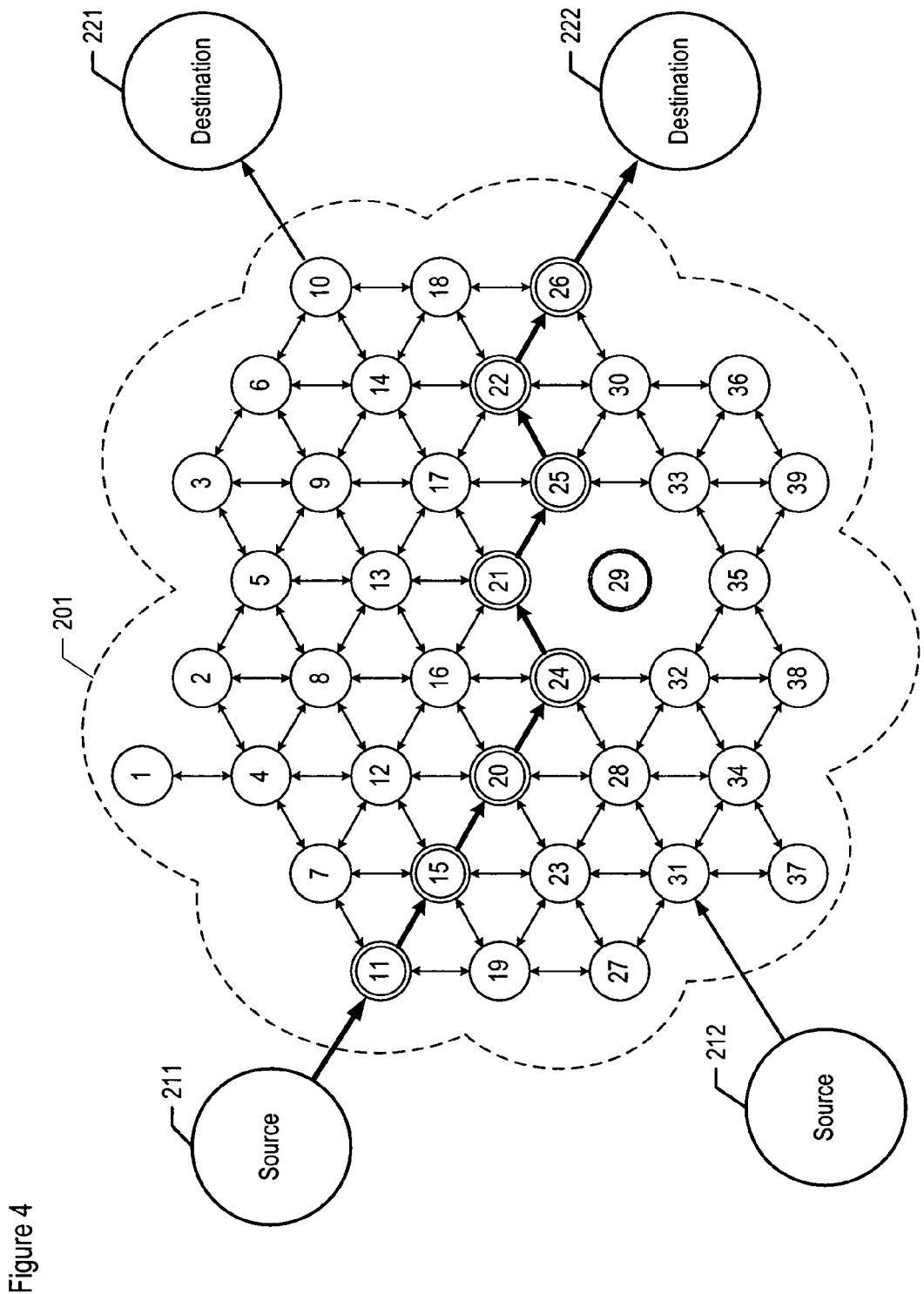
FIG. 4 depicts one alternative nominal path through network 201 from source node 211 to destination node 222, which bypasses node 29.

Because any one of the nodes in the primary nominal path can divert the packet off of the primary nominal path and onto an alternative nominal path, each primary nominal path usually has associated with it a plurality of alternative nominal paths. For example, FIG. 4 depicts one alternative nominal path through network 201 from source node 211 to destination node 222, which bypasses node 29.

Once the packet has been forwarded onto an alternative nominal path, however, any node in the alternative nominal path can again divert the packet onto yet another alternative nominal path. In some networks, every node in a network is either in (1) the primary nominal path or (2) at least one alternative nominal path. In some other networks, however, there are nodes that are not in either (1) the primary nominal path or (2) any of the alternative nominal paths. The difference depends on:
  (i) the number of nodes in the network,
  (ii) the network's topology, and
  (iii) the number of alternative next nodes in each node's routing table.

It will be clear to those skilled in the art how to determine the primary nominal path and the alternative nominal paths between any two nodes in any network.

Figure 5:
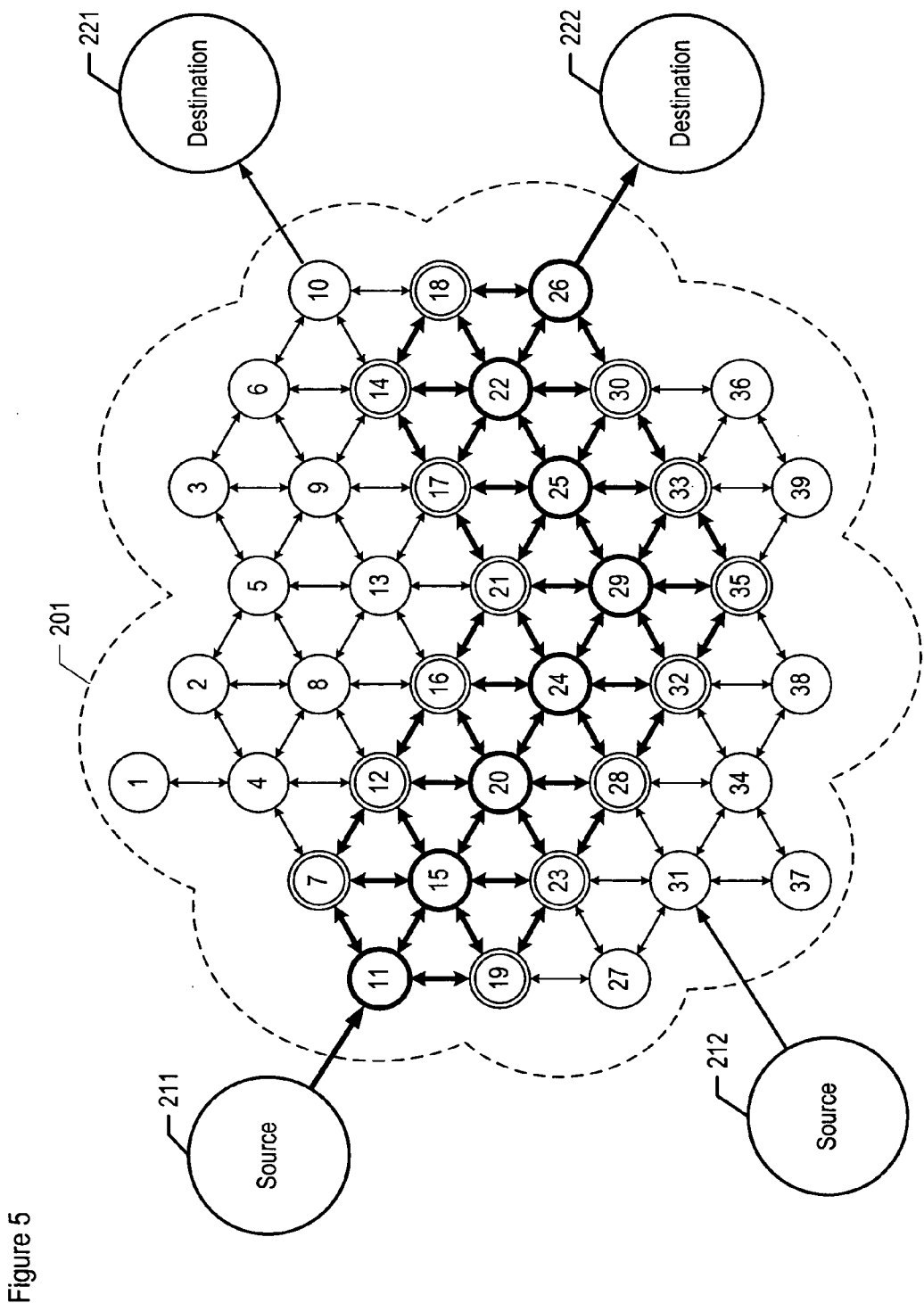
FIG. 5 depicts the primary nominal path and all of the alternative nominal paths through network 201 from source node 211 to destination node 222.

FIG. 5 depicts the primary nominal path and all of the alternative nominal paths through network 201 from source node 211 to destination node 222. For the purposes of this specification, a node in a network that is with the subgraph of nominal paths is defined as a "nominal path node" and a node that is not within the subgraph of nominal paths is defined as an "extranominal path node."

The resources of a network have the topology of a graph, and the primary and alternative nominal paths have the topology of a subgraph. This significance of this is that the network itself, in the prior art and without the advantage of the present invention, provides a degree of robustness—with respect to bandwidth, error rate, and latency—within the subgraph of nominal paths, but not generally enough for some applications. In contrast, the illustrative embodiment takes into account that one or more extranominal path nodes can be used in the transporting of a packet to increase the likelihood that the quality of service goals for the packet are achieved.

Figure 6:
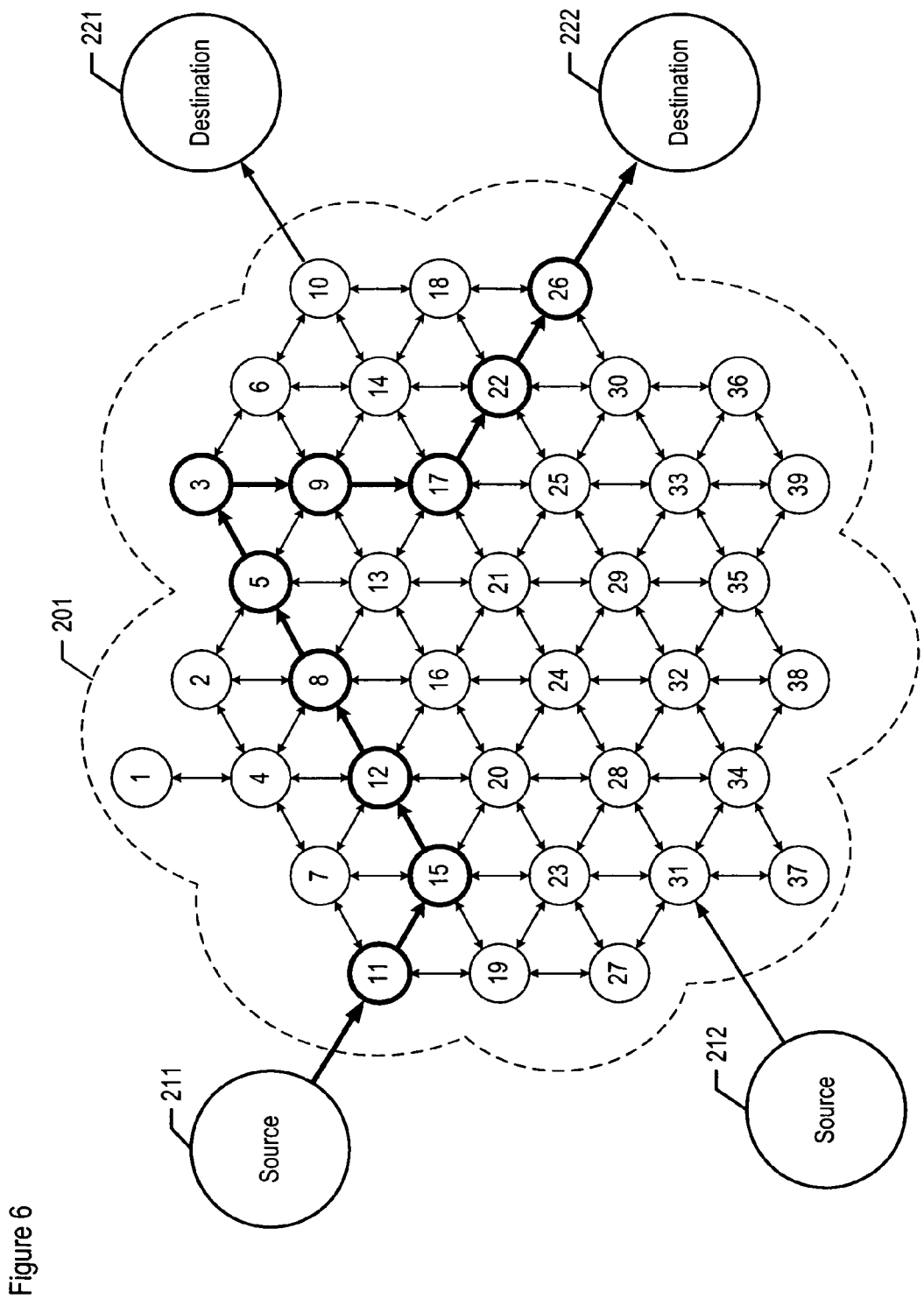
FIG. 6 depicts the use of extranominal node 3 as a ricochet node for a packet that leaves source node 211 for destination node 222.

FIG. 6 depicts the use of extranominal path node 3 as a relay, or "ricochet,"node for a packet that leaves source node 211 for destination node 222. In this case, the packet takes a first path from source node 211 to node 3 and then a second path to destination node 222. The path from source node 211 to destination node 222 through node 3 is indirect, in contrast to one of the nominal paths from source node 211 to destination node 222, because source node 211 specifies node 3 in the packet's path. In other words, when source node 211 specifies an intermediate or ricochet node in the packet's path on its way to destination 222, the packet is taking an indirect path—regardless of whether the ricochet node is a nominal path node or not.

For the purposes of this specification, the term "indirect" path is defined as a path from a source node to a destination node with a specified intermediate node, regardless of whether or not the intermediate node is a nominal path node or not. Some, but not all, indirect paths are nominal paths. Conversely, and for the purposes of this specification, the term "direct" path is defined as a path from a source node to a destination node without a specified intermediate node. All direct paths are nominal paths.

Before source node 211 specifies node 3 in the packet's path and transmits the packet, node 211—or some other evaluating node, for that matter—evaluates the quality of service of the indirect network path through node 3 with respect to that of the direct network path. Node 211 evaluates the quality of service to see if the quality of service of the indirect path is more advantageous. As part of evaluating the quality of service of the indirect versus direct path, node 211 has to acquire quality-of-service information for both the indirect and direct network paths. As is well known to those skilled in the art, the quality of service of each network path is measured by:
  i. bandwidth, or
  ii. error rate, or
  iii. latency, or
  iv. a derivative or associated function of bandwidth, or
  v. a derivative or associated function of error rate (e.g., packet loss, etc.), or
  vi. a derivative or associated function of latency (e.g., jitter, etc.), or
  vii. any combination of i, ii, iii, iv, v, and vi.

Source node 211, for example, can acquire quality-of-service information for the direct path by transmitting a time-stamped test packet to destination node 222 with an instruction to destination 222 to time stamp the test packet again and return the results to source node 211. The general technique of transmitting a test packet and receiving performance-related results based on the test packet is referred to as "probing" and can be repeated, either sporadically or periodically, for each network path being tested. Alternatively, source 211 can acquire quality-of-service information for the direct path by using the actual stream of transmitted RTP (i.e., Real-time Transport Protocol) traffic packets to test the path; in this way, the RTP stream serves as a "free" probing stream, as the RTP packets comprise timestamp information.

Source node 211 also acquires quality-of-service information for the indirect network path through node 3 by using the technique of the present invention. The details of how the quality of service of the indirect network path is acquired and evaluated are described below and with respect to FIGS. 7 through 11. In this case, node 3 is an extranominal node, but it will be clear to those skilled in the art how to make and use alternative embodiments of the present invention in which node 3 is a nominal path node.

Figure 7:
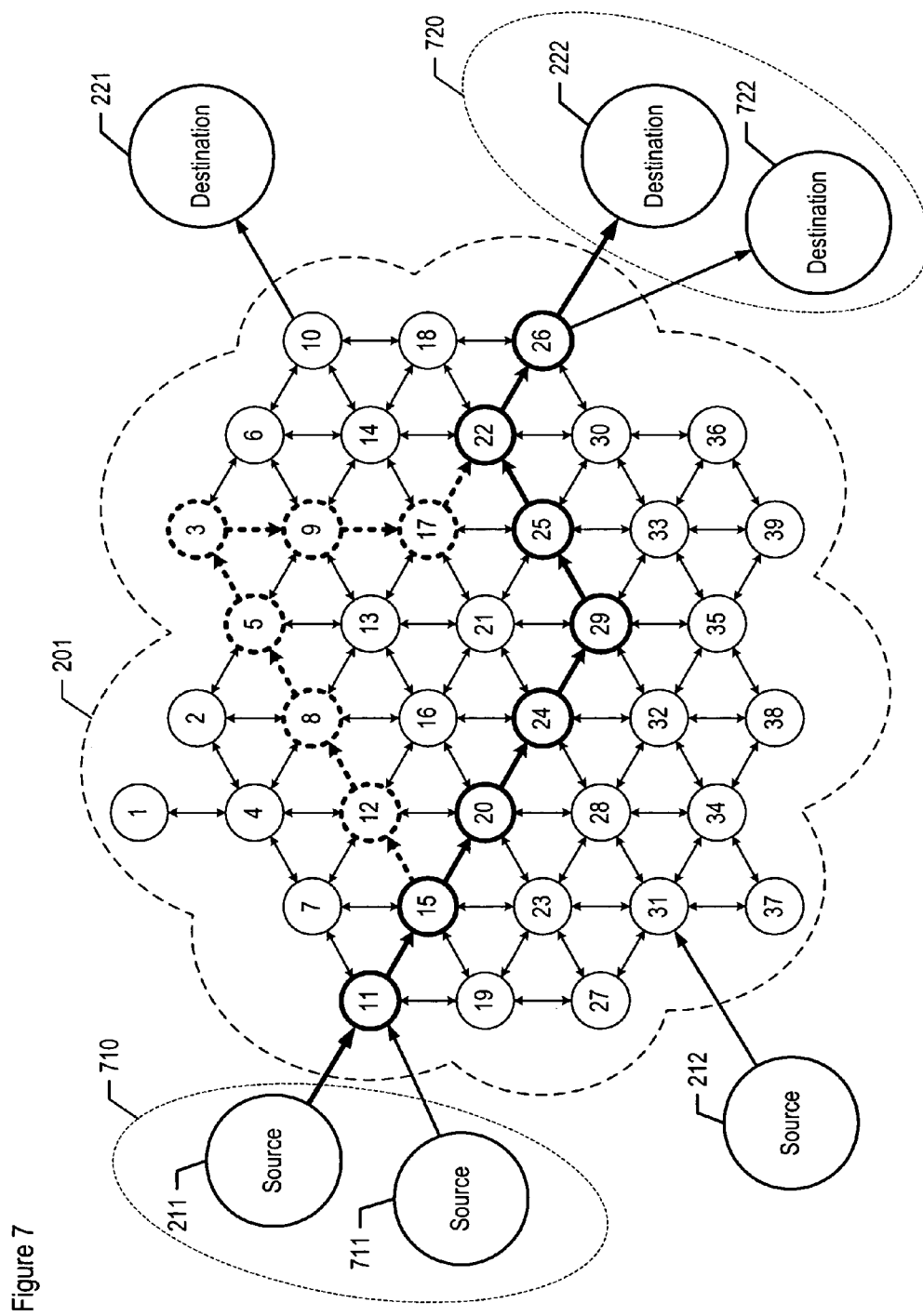
FIG. 7 depicts an indirect network path between nodes 211 and 222 through ricochet node 3 that is to be considered as an alternative packet transmission path to the primary nominal path from node 211 to node 222.

FIG. 7 depicts subnetworks 710 and 720, in addition to network 201, interconnected as shown. Source node 211 and destination node 222 are part of subnetworks 710 and 720, respectively. Subnetworks 710 and 720 further comprise source node 711 and destination node 722, respectively. Subnetwork 710 can be, for example, a first enterprise network, in which nodes 211 and 711 are Internet Protocol-based telephones; likewise, subnetwork 720 can be a second enterprise network, in which nodes 222 and 722 are also Internet Protocol-based telephones. In addition, FIG. 7 depicts an indirect network path between nodes 211 and 222 through ricochet node 3 that is to be considered as an alternative packet transmission path to the also-depicted primary nominal path from node 211 to node 222.

In FIG. 7, a node in subnetwork 710—in this case, node 211—is evaluating the use of extranominal path node 3 as a ricochet node for one or more packets to be transmitted from source node 211 to destination node 222. The packets to be transmitted would take a first path from source node 211 to node 3 and then a second path to destination node 222. In a first evaluation technique with endpoint-coordinated measuring, source node 211 acquires quality-of-service information for the indirect path by transmitting a time-stamped test packet through node 3 to destination node 222 with an instruction for destination 222 to (i) time stamp the test packet again and (ii) return the results to source node 211. This probing technique performed by endpoint node 211 can be repeated, either sporadically or periodically, to accumulate enough quality-of-service information about the indirect path through node 3.

Figure 8:
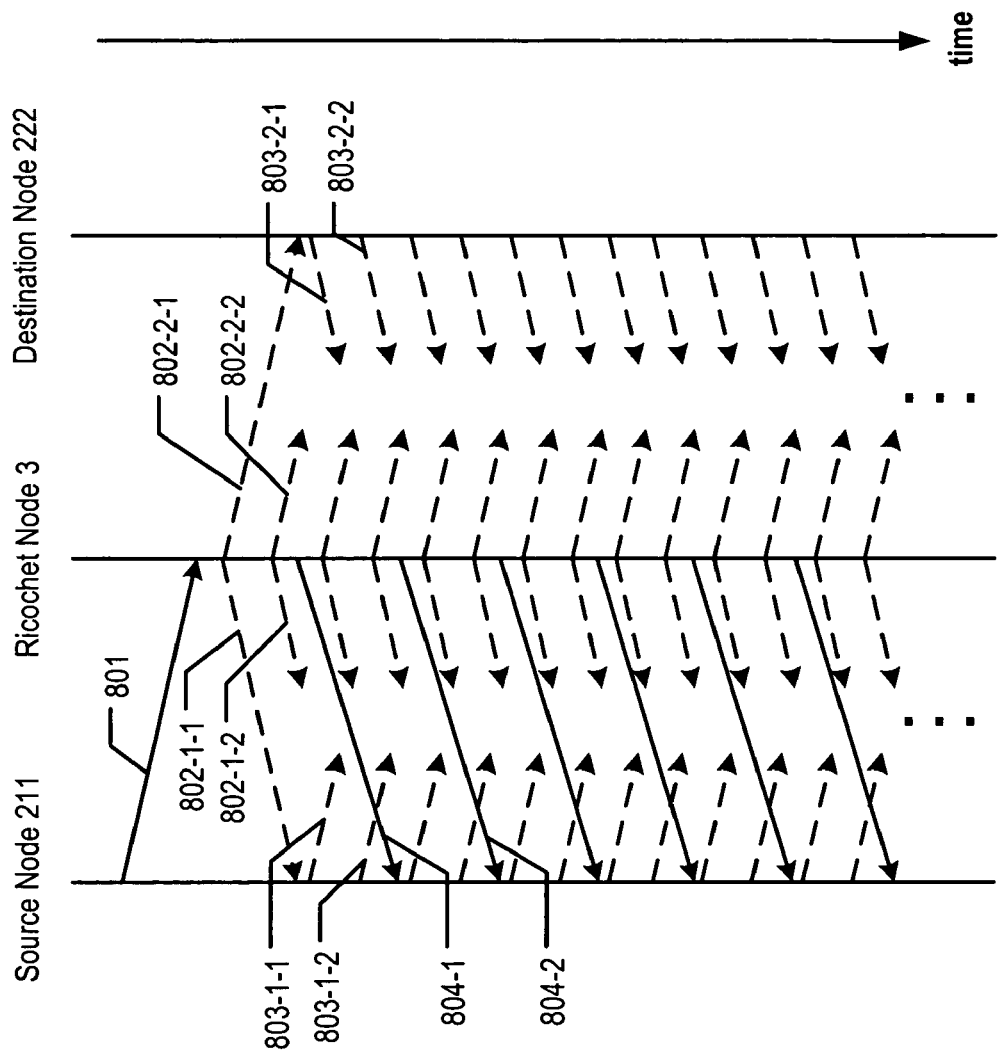
FIG. 8 depicts the probing of source node 211 and destination node 222 by node 3.
Figure 9:
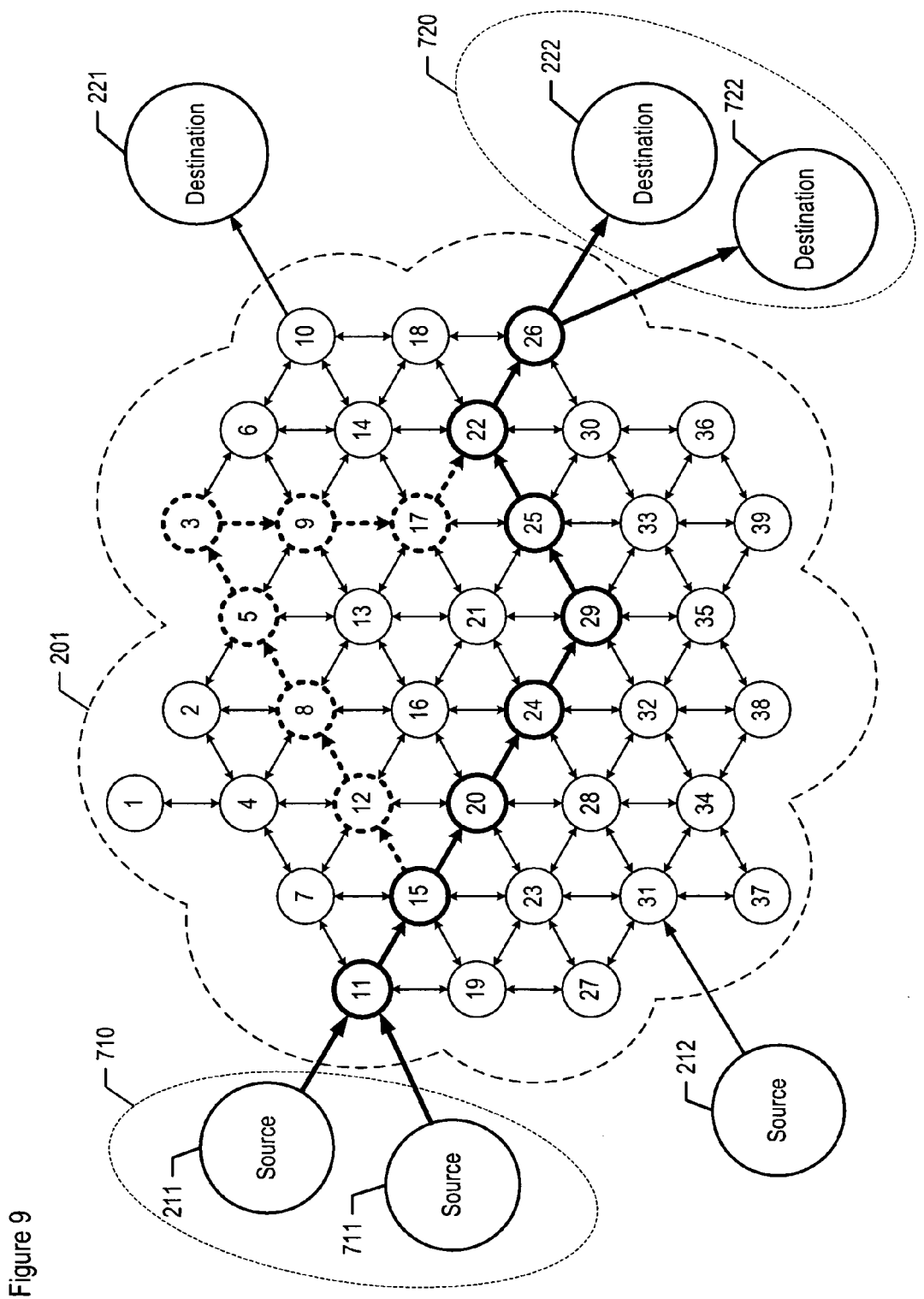
FIG. 9 depicts a path between source node 711 and node 3 and a path between node 3 and destination node 722, both of which endpoint nodes are already being probed by node 3.
Figure 10:
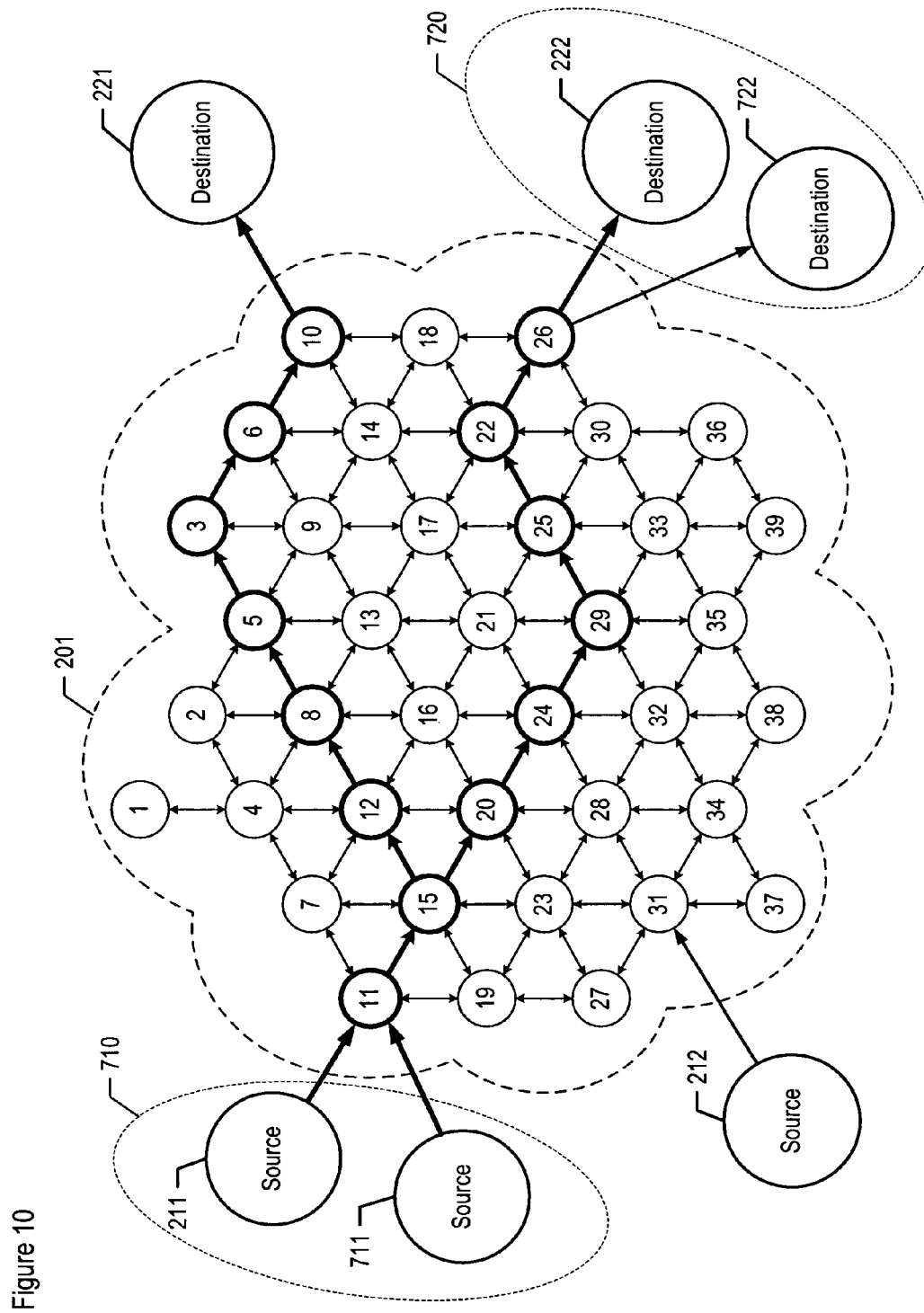
FIG. 10 depicts a path through network 201 from source node 711 through node 3 to destination node 221, in addition to depicting the primary nominal path from source node 211 to destination node 222.

FIG. 8 depicts a first variation of a second evaluation technique with relay-coordinated measuring, in which a source node—in this case, source node 211—instructs a ricochet node—in this case, ricochet node 3—to probe one or more paths that have node 3 as an endpoint. For example, a first path is between source node 211 and node 3, and a second path is between node 3 and destination node 222. Node 211 sends request 801 to node 3 to request that one or more quality-of-service measurements be sent; this can occur, for example, while a packet stream is being sent between nodes 211 and 222 (e.g., as part of a call, etc.) along the primary nominal path. Request 801, among other protocol-specific information, contains information on how often node 211 would like to receive measurement results from node 3, such as every t milliseconds in the example. Upon receiving request 801, node 3 first checks if one or both subnetworks of nodes 211 and 222 are being probed (e.g., due to another call, etc.), in accordance with the illustrative embodiment. If so, then node 3 does not need to probe the endpoint whose subnetwork is already being probed; examples of this scenario are illustrated in FIGS. 9 and 10. Otherwise, node 3 starts probing the two endpoints, nodes 211 and 222.

In probing both endpoints, node 3 starts sending probes at regular intervals. The probes—that is, probes 802-1-1, 802-2-1, 802-1-2, 802-2-2, and so forth—are indicated with dashed lines originating from node 3 in FIG. 8. When nodes 211 and 222 receive probe messages from node 3, they respond back to node 3, as shown by probe responses 803-1-1, 803-2-1, 803-1-2, 803-2-2, and so forth. Node 3 computes raw performance data based on the probe response messages from nodes 211 and 222 as they arrive. From the raw performance data, node 3 computes a quality-of-service measurement for the end-to-end indirect path between nodes 211 and 222 through node 3 for the last t milliseconds. Node 3 reports the quality-of-service measurement (i.e., comprising one or more of bandwidth, error rate, and latency) to node 211, or to another node if requested. Quality-of-service measurements 804-1, 804-2, and so forth are reported to node 211 every t milliseconds.

FIG. 9 depicts a second variation of the second evaluation technique with relay-coordinated measuring. In this example, source node 711 is sending traffic packets to destination node 722, in addition to source node 211 sending traffic packets to destination node 222, where both packet streams are being sent through the depicted primary nominal path. Source node 711, however, has previously requested quality-of-service measurements from node 3 for the also-depicted indirect network path between nodes 711 and 722.

As with the example depicted in FIG. 7, node 211 instructs node 3 to probe a first path between source node 211 and node 3 and a second path between node 3 and destination node 222. Upon receiving the request, node 3 determines that one or both subnetworks 710 and 720 are already being probed—in this case, both subnetworks are being probed. As a result, for each endpoint whose subnetwork is already being probed due to another call—in this case, the call between source node 711 and destination node 722—node 3 does not need to probe that endpoint. Instead, node 3 uses the probes that are already in progress to acquire the data needed to generate the quality-of-service measurements. Node 3 may use a probe-in-progress for one path in combination with a newly initiated probe for another path to compute data for the end-to-end path, where node 3 will use the data to generate the quality-of-service measurements.

FIG. 10 depicts a third variation of the second evaluation technique with relay-coordinated measuring. In this example, source node 211 is sending traffic packets to destination node 222 via the primary nominal path between nodes 211 and 222. In addition, source node 711 is sending traffic packets to destination node 221 along an indirect network path, as the result of node 711 having previously specified node 3 as a ricochet node. Because node 711 has specified node 3 to be in the end-to-end path, node 711 is also able to instruct node 3 to probe (i) the first part of the path between nodes 711 and 3 and (ii) the second part of the path between nodes 3 and 221. As shown in FIG. 10, the first part of the indirect network path that carries the packet stream between nodes 711 and 221 coincides with the path between node 211 and node 3 shown in the previous examples.

Meanwhile, node 211, which is sending packets to node 222, instructs node 3 to probe the path between source node 211 and node 3 and the path between node 3 and destination node 222; this is similar to the example depicted in FIG. 7. Upon receiving the request, node 3 checks whether it is already probing one or both of subnetworks 710 and 720. In this scenario, node 3 is already probing subnetwork 710 in conjunction with the call between source node 711 and destination node 221. As a result, for each endpoint whose subnetwork is already being probed due to another call-in this case, the call between source node 711 and destination node 221—node 3 does not need to initiate a probe for that endpoint. Instead, node 3 uses the probe that is already in progress to acquire at least some of the data needed to generate the quality-of-service measurements. Node 3 uses (i) the probe-in-progress for the "node 711 to node 3" path in combination with (ii) a newly initiated probe for the "node 3 to node 222" path, to compute performance data for the end-to-end indirect path between subnetworks 710 and 720. Alternatively, node 3 may use (i) the probe-in-progress for the first path in combination with (ii) a second probe-in-progress from another call for the second path, to compute the end-to-end performance data. As those who are skilled in the art will appreciate, there are other combinations of probes that node 3 can use to compute performance data for the end-to-end path between nodes 211 and 222.

Figure 11:
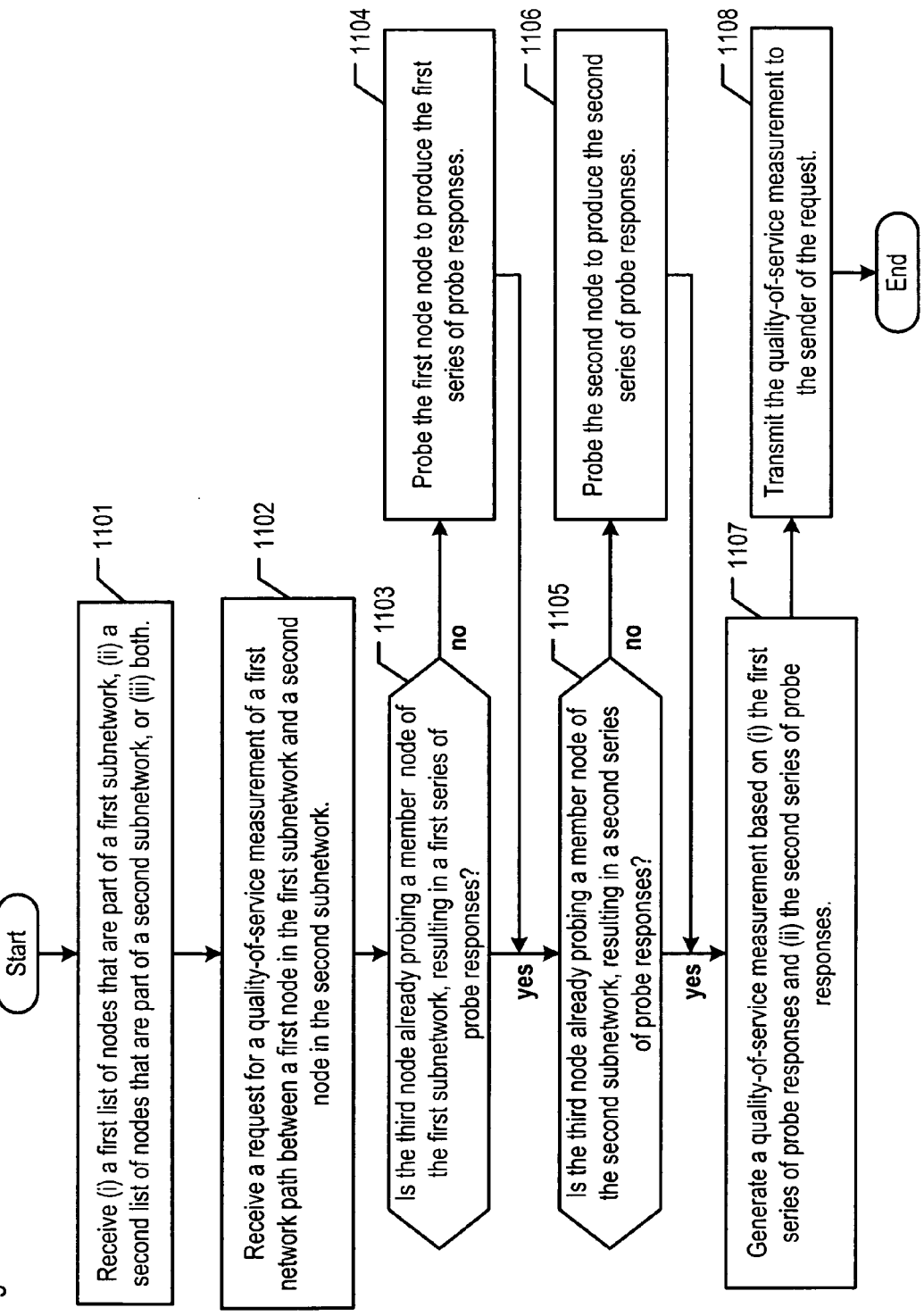
FIG. 11 depicts a flowchart of the salient tasks associated with the operation of the illustrative embodiment of the present invention.

FIG. 11 depicts a flowchart of the salient tasks associated with the operation of the illustrative embodiment of the present invention. In the example depicted in FIG. 11, source node 211 is transmitting a packet stream to destination node 222 and has transmitted a request to ricochet node 3 to start providing quality-of-service measurements. As those who are skilled in the art will appreciate, in some alternative embodiments, a node other than source node 211 can transmit the request.

At task 1101, ricochet node 3 receives from a node (e.g., node 211, node 222, etc.) at least one of (i) a first list of nodes and (ii) a second list of nodes. The first list of nodes identifies the nodes that compose subnetwork 710, and the second list of nodes identifies the nodes that compose subnetwork 720. In some embodiments, node 3 receives the two lists of nodes from two different nodes.

At task 1102, node 3 receives a request for one or more quality-of-service measurements from one of the nodes—in this case, node 211—in either subnetwork 710 or 720. In some alternative embodiments, node 3 receives the request from a node that is outside of subnetworks 710 and 720. In some embodiments, the lists of nodes and the request for quality-of-service measurements are received as part of the same message.

At task 1103, if node 3 is already probing a node in subnetwork 710, such as node 711, then task execution proceeds to task 1105. Otherwise, task execution proceeds to task 1104. Node 3 uses the first list of nodes to determine which nodes are in the same subnetwork as node 211.

At task 1104, node 3 starts probing source node 211 in subnetwork 710 to produce a first series of probe responses, such as probe responses 803-1-1, 803-1-2, and so forth.

At task 1105, if node 3 is already probing a node in subnetwork 720, such as node 722, then task execution proceeds to task 1107. Otherwise, task execution proceeds to task 1106. Node 3 uses the second list of nodes to determine which nodes are in the same subnetwork as node 222.

At task 1106, node 3 starts probing source node 222 in subnetwork 720 to produce a second series of probe responses, such as probe responses 803-2-1, 803-2-2, and so forth.

At task 1107, node 3 computes raw performance data based on the probe responses. Specifically, node 3 combines the probe responses from subnetwork 710 with the probe responses from subnetwork 720 to compute an intermediate result for the end-to-end network path from subnetwork 710 to subnetwork 720. Node 3 generates a quality-of-service measurement—such as measurements 804-1, 804-2, and so forth—based on one or more intermediate results, depending in part on how often the probe responses arrive versus how often node 211 expects to receive quality-of-service measurements.

At task 1108, node 3 transmits the quality-of-service measurement to source node 211. Node 3 can then continue to receive additional probe responses, generate new quality-of-service measurements, and transmit those measurements.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
receiving by a third node a request for a quality-of-service measurement of a network path between a first node in a first subnetwork and a second node in a second subnetwork through the third node, wherein the network path fails to provide a quality-of-service guarantee;
generating by the third node the quality-of-service measurement for the network path, wherein the quality-of-service measurement is based on:
(i) a first series of probe responses that corresponds to a first probing, by the third node, of a member node of the first subnetwork other than the first node, wherein the first probing is via a first span between the third node and the member node of the first subnetwork, and
(ii) a second series of probe responses that corresponds to a second probing, by the third node, of a member node of the second subnetwork, wherein the second probing is via a second span between the third node and the member node of the second subnetwork; and
receiving by the third node a list of nodes that are part of the first subnetwork, wherein the first node is on the list of nodes.

2. The method of claim 1 further comprising determining by the third node that the third node is already probing a fourth node, wherein the fourth node is the member node of the first subnetwork other than the first node.

3. The method of claim 2 further comprising probing the second node by the third node, wherein the probing of the second node is based on the request and wherein the second node is the member node of the second subnetwork.

4. The method of claim 2 further comprising determining by the third node that the third node is already probing a fifth node, wherein the fifth node is the member node of the second subnetwork.

5. The method of claim 1 further comprising transmitting by the third node the quality-of-service measurement to a sender of the request.

6. The method of claim 5 wherein the first node is the sender of the request.

7. The method of claim 5 wherein the second node is the sender of the request.

8. The method of claim 1 wherein the list of nodes and the request are received from two different nodes.

9. A method comprising:
receiving by a third node a request for a quality-of-service measurement of a network path between a first node in a first subnetwork and a second node in a second subnetwork through the third node, wherein the network path fails to provide a quality-of-service guarantee;
determining by the third node that the third node is already probing a fourth node in the first subnetwork, wherein the probing of the fourth node results in a first series of probe responses;
generating by the third node the quality-of-service measurement for the network path, wherein the quality-of-service measurement is
based on (i) the first series of probe responses and (ii) a second series of probe responses, wherein the second series of probe responses corresponds to a probing, by the third node, of a node in the second subnetwork; and
receiving by the third node a list of nodes that are part of the first subnetwork, wherein the fourth node is on the list of nodes,
wherein the first series of probe responses is via a first span between the third node and the fourth node, and wherein the second series of probe responses is via a second span between the third node and the node in the second subnetwork.

10. The method of claim 9 wherein the node in the second subnetwork is the second node.

11. The method of claim 9 further comprising determining by the third node that the third node is already probing a fifth node in the second subnetwork, wherein the probing of the fifth node results in the second series of probe responses.

12. The method of claim 9 further comprising transmitting by the third node the quality-of-service measurement to a sender of the request.

13. The method of claim 12 wherein the first node is the sender of the request.

14. The method of claim 12 wherein the second node is the sender of the request.

15. The method of claim 9 wherein the list of nodes and the request are received from two different nodes.

16. A method comprising:
    receiving by a third node:
        (i) a first list of nodes that are part of a first subnetwork, and
        (ii) a request for a quality-of-service measurement of a first network path between a first node in the first subnetwork and a second node in a second subnetwork through the third node, wherein the first network path fails to provide a quality-of-service guarantee, wherein the requested quality-of-service measurement is based on probing by the third node of at least one node of the first subnetwork and at least one node of the second subnetwork;
    determining by the third node whether to probe the first node to produce a first series of probe responses, based on whether the third node is already evaluating a second network path between (i) the third node and (ii) a fourth node that is on the first list of nodes; and
    declining to probe the first node when the third node is already evaluating the second network path;
    receiving by the third node a second list of nodes that are part of the second subnetwork; and
    determining by the third node whether to probe the second node to produce a second series of probe responses, based on whether the third node is already evaluating a third network path between (i) the third node and (ii) a fifth node on the second list of nodes; and
    declining to probe the second node when the third node is already evaluating the third network path.

17. The method of claim 16 wherein the evaluating of the second network path comprises at least one of (i) probing the fourth node and (ii) utilizing one or more traffic packets of a call in progress.

18. The method of claim 16 wherein the first list of nodes and the second list of nodes are received from the same node.

19. The method of claim 16 further comprising probing the second node by the third node, wherein the probing of the second node is based on the request and results in a second series of probe responses.

20. The method of claim 19 further comprising transmitting by the third node the quality-of-service measurement to a sender of the request, wherein the quality-of-service measurement is based on the first series of probe responses and the second series of probe responses.

* * * * *